United States Patent
Zimmerman

(10) Patent No.: US 12,508,973 B2
(45) Date of Patent: Dec. 30, 2025

(54) TRAILER FOR TRANSPORTING AND DISCHARGING BUILDING TRUSSES

(71) Applicant: Linford Zimmerman, New Holland, PA (US)

(72) Inventor: Linford Zimmerman, New Holland, PA (US)

( * ) Notice: Subject to any disclaimer, the term of this patent is extended or adjusted under 35 U.S.C. 154(b) by 572 days.

(21) Appl. No.: 17/901,355

(22) Filed: Sep. 1, 2022

(65) Prior Publication Data
US 2023/0097686 A1  Mar. 30, 2023

Related U.S. Application Data

(60) Provisional application No. 63/247,932, filed on Sep. 24, 2021.

(51) Int. Cl.
| | |
|---|---|
| *B60P 3/40* | (2006.01) |
| *B60P 1/16* | (2006.01) |
| *B60P 1/48* | (2006.01) |

(52) U.S. Cl.
CPC .................. *B60P 3/40* (2013.01); *B60P 1/165* (2013.01); *B60P 1/486* (2013.01)

(58) Field of Classification Search
CPC ........... B60P 3/40; B60P 1/6472; B60P 1/486; B60P 1/6436; B60P 1/5428; B60P 3/16472
See application file for complete search history.

(56) References Cited

U.S. PATENT DOCUMENTS

| | | | |
|---|---|---|---|
| 3,091,498 A | 5/1963 | Goodwin | |
| 3,399,791 A * | 9/1968 | Goodwin | B60P 1/6436 414/470 |
| 4,750,785 A | 6/1988 | Helton | |
| 5,017,081 A | 5/1991 | Helton | |
| 7,802,817 B1 | 9/2010 | Hager et al. | |
| 8,360,706 B2 * | 1/2013 | Addleman | B60P 3/12 414/471 |

FOREIGN PATENT DOCUMENTS

FR  2650979 A * 2/1991 ............. B60P 1/486

* cited by examiner

*Primary Examiner* — Daniel J Colilla
(74) *Attorney, Agent, or Firm* — Miller Law Group, PLLC

(57) ABSTRACT

A truss transportation trailer has a front assembly and a rearward assembly interconnected by a central elongated beam so that the trusses can be supported in an inverted manner between the assemblies. Each assembly includes an outrigger on each side of the assembly along with a pivotable carrier apparatus. Each carrier apparatus includes a telescopic support with an outer shell being pivoted to the frame of the trailer for movement between a vertical orientation and a horizontal orientation extending laterally of the trailer. Each carrier apparatus also includes a head mounted on an inner shaft and having a fixed inner bracket and a movable outer bracket driven by a hydraulic motor to clamp trusses between the two brackets. Once in the horizontal orientation, the inner shaft can extend hydraulically from the outer shell to push the discharged trusses away from the trailer and facilitate the departure of the trailer.

19 Claims, 10 Drawing Sheets

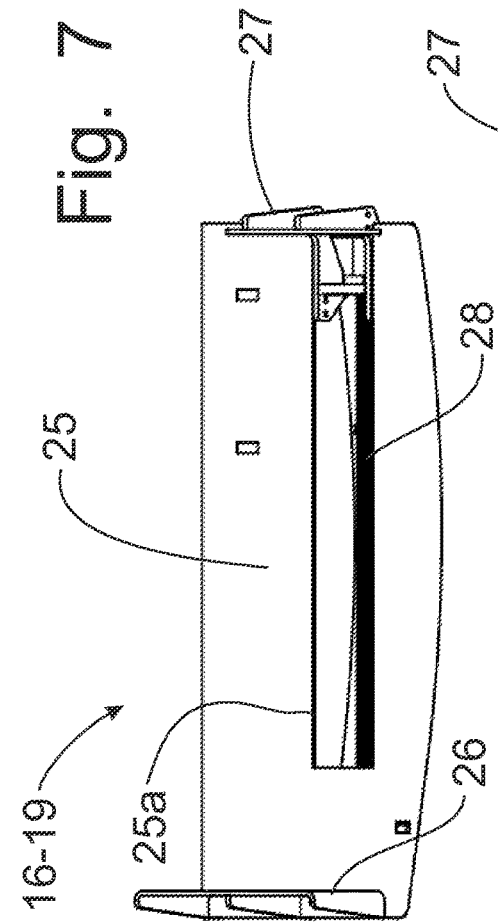
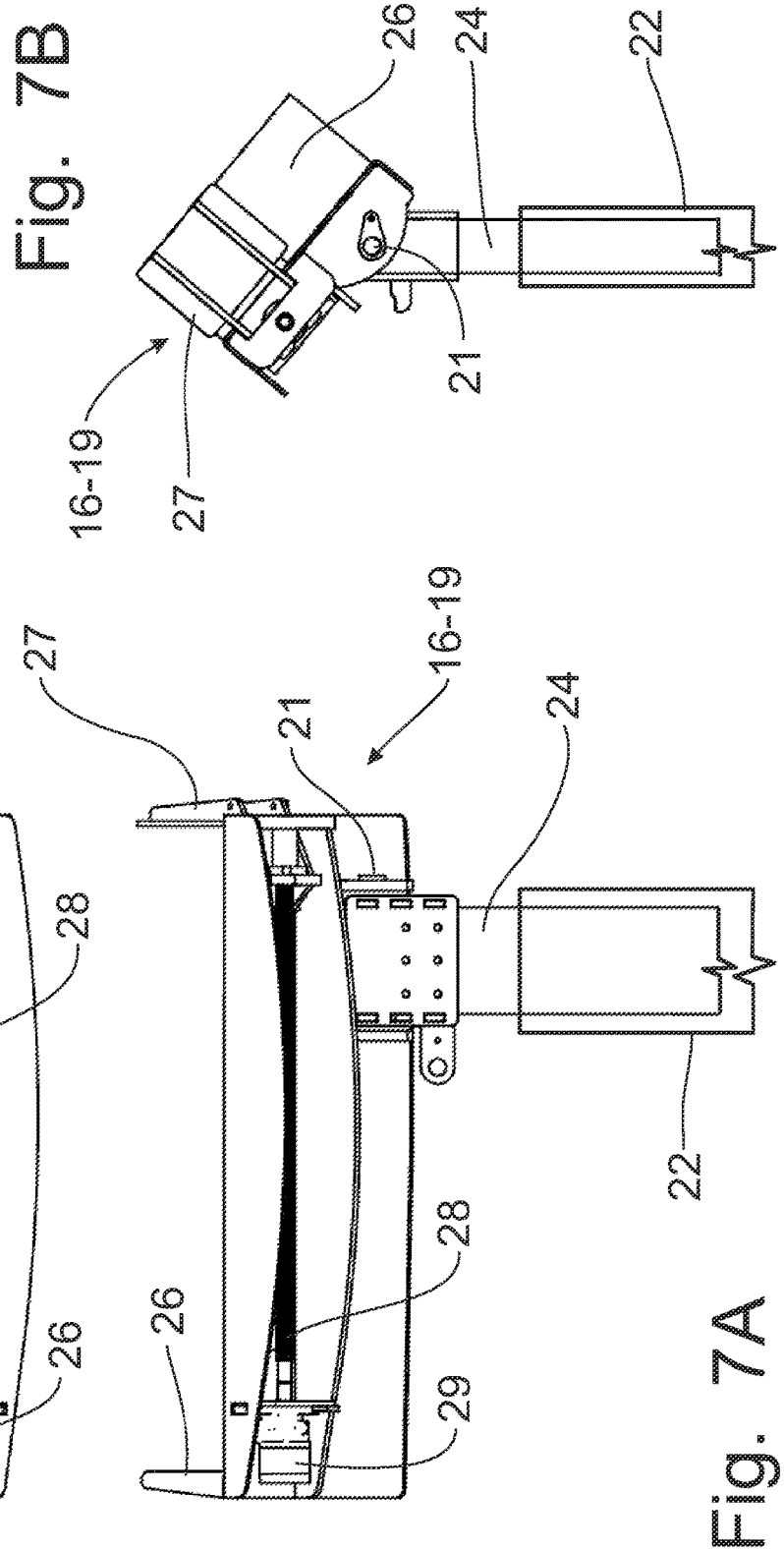

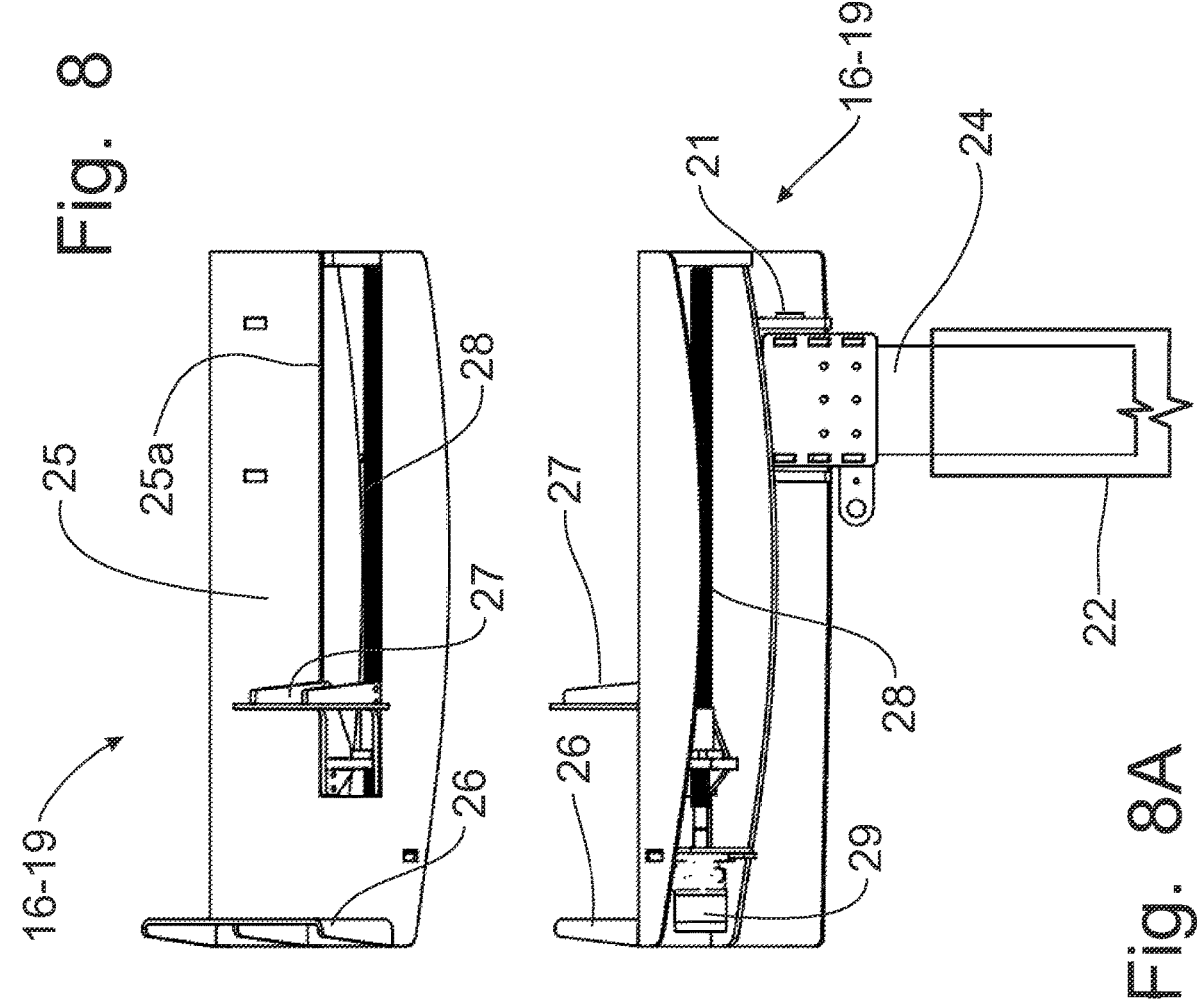

TRAILER FOR TRANSPORTING AND DISCHARGING BUILDING TRUSSES

CROSS-REFERENCE TO RELATED APPLICATIONS

This application claims domestic priority on U.S. Provisional Patent Application Ser. No. 63/247,932, filed on Sep. 24, 2021, the content of which is incorporated herein by reference.

FIELD OF THE INVENTION

This invention relates generally to trailer for transporting building trusses and, more particularly, to a truss carrier including apparatus for discharging the building trusses from the trailer.

BACKGROUND OF THE INVENTION

Building trusses are used in the housing and building industry for the fabrication of houses and other similar structures. Trusses are particularly used in the construction of roofing systems in which the trusses are supported on the load-bearing frame of the structure in a spaced-apart relationship to span the length and width of the structure. Roofing materials are then secured to the trusses to finish the roofing system. Trusses are typically formed at a remote location, often at a lumber yard, according to design specifications. The trusses then have to be transported to the building site and placed onto the structure being constructed.

Trusses are often transported on trailers in a horizontal transport position laid flat on the trailer and stacked as appropriate. The trusses are bound together by a removable strap and the stack is secured to the bed of the trailer in order to transport the stack of trusses over the highway. A difficulty with such a transporting system is that the trusses are often too wide or too long to fit within the confines of the trailer and auxiliary transport assistance is required because of the oversize of the cargo, increasing the expense of transporting trusses from the point of manufacture to the point of installation.

Trusses can also be transported vertically, either upright or inverted, although inverted seems to be the preferred orientation for transport. As an example, U.S. Pat. No. 3,091,498, granted to Wayne M. Goodwin on May 28, 1963, discloses an elongated trailer that carries trusses in an inverted configuration. The frame of the trailer is a longitudinal, central member that interconnects the hitch for the trailer with the rear wheel assembly. Trusses are loaded onto support members pivotally supported on opposing sides of the center of the trailer and secured to the frame of the trailer by a releasable anchor. When the trusses have been delivered to the job site, the anchor is released, and a hydraulic cylinder tilts the support member to the side of the trailer so that the trusses can be removed from the trailer easily.

In U.S. Pat. No. 4,750,785, granted to Jesse D. Helton on Jun. 14, 1988, and in U.S. Pat. No. 5,017,081, granted to Jesse D. Helton on May 21, 1991, a truss transportation trailer is also disclosed in which the trusses are carried in an inverted configuration, mounted on opposing support members that are anchored to the frame of the trailer in a manner similar to the Goodwin patent, and allowed to tilt outboard to facilitate the removal of the trusses from the support member. The '081 Helton patent is a continuation-in-part to the '785 Helton patent and adds a stability control apparatus to assist the lowering of the support members to gain convenient access to the trusses carried thereby.

The truss transportation trailer disclosed in U.S. Pat. No. 7,802,817, issued on Sep. 28, 2010, to James L. Hager, et al, is operable to load trusses in either vertical configuration, including inverted with the apex received within a slot on the bed frame, or an upright with the flat bottom resting on the bed frame structure. A fastening mechanism secures the loaded trusses against the vertical support member. Thus, the trusses can be transported in a desired orientation from the site of manufacture to the site of utilization. The Hager patent does not disclose a tilting mechanism for facilitating the removal of the trusses from the trailer.

It would be desirable to provide an improved truss transport carrier that is adapted to permit a convenient discharge of the trusses from the carrier and allow the carrier to depart quickly.

SUMMARY OF THE INVENTION

It is an object of this invention to overcome the disadvantages of the prior art by providing a truss transportation trailer that will permit a convenient discharge of the trusses being carried on the trailer to the side of the trailer.

It is another object of this invention to provide a truss transportation trailer that will carry a load of building trusses on each side of a trailer on carrier members that are pivotally mounted to the frame of the trailer in order to allow the carrier to lower laterally of the trailer.

It is a feature of this invention that the carrier members are formed with front and rear heads that support the weight of the load of trusses being transported.

It is another feature of this invention that the carrier members are pivoted to move laterally of the truss transportation trailer to discharge a load of trusses to the ground at a position that is lateral of the trailer.

It is an advantage of this invention that the discharged trusses are positioned away from the truss transportation trailer so that the trailer can depart from the construction site without interference from the discharged trusses.

It is still another feature of this invention that the carrier members are telescopic.

It is another advantage of this invention that the telescopic carrier members are operable to push the discharged trusses away from the truss transportation trailer to provide additional clearance for the unloaded trailer to depart from the discharge area.

It is another feature of this invention that the transportation trailer is formed with a front assembly and a rearward assembly interconnected by a longitudinally extending elongated beam.

It is still another advantage of this invention that the rear assembly is movable along the length of the elongated beam and latched into a selected position on the elongated beam to accommodate different sizes of building trusses to be transported.

It is still another object of this invention to provide a hydraulic system for the truss transportation trailer to operate the movable components of the trailer for carrying and discharging building trusses.

It is yet another feature of this invention that the hydraulic system has controls mounted on the rearward assembly on opposing sides thereof to operate the hydraulic components on the corresponding side of the trailer.

It is yet another advantage of this invention that the operator manipulating the hydraulic controls will be able to control the hydraulic controls for those hydraulic components in front of the operator.

It is a further feature of this invention that the head on the carrier members is pivotally mounted in an offset manner so that the unloaded carrier member head will pivot into a generally horizontal orientation for efficient transport.

It is a further advantage of this invention that the head on the carrier members will match the incline angle of the truss when mounted on the carrier member heads for transportation thereof.

It is another object of this invention that each of the front and rearward assemblies have a carrier member mounted thereon, with one carrier member on each side thereof.

It is still a further feature of this invention that each of the carrier member heads include a fixed vertical bracket and a laterally movable vertical bracket.

It is still a further advantage of this invention that the movable vertical bracket is laterally movable relative to the fixed vertical bracket to clamp the load of building trusses therebetween during transport.

It is another feature of this invention that the movable vertical bracket is mounted on a threaded rod that is rotated by a hydraulic motor to clamp against a load of building trusses.

It is still a further object of this invention to provide a truss transportation trailer for use in transporting a load of building trusses to a construction site for discharge to the ground that is durable in construction, inexpensive of manufacture, carefree of maintenance, easy to assemble, and simple and effective in use.

These and other objects, features and advantages are accomplished according to the instant invention by providing a truss transportation trailer having a front assembly and a rearward assembly interconnected by a central elongated beam so that the trusses can be supported in an inverted manner between them. Each of the front and rear assemblies include an outrigger on each side of the assembly along with a pivotable carrier apparatus. Each carrier apparatus includes a telescopic support with the outer shell being pivoted to the frame of the trailer for movement between a vertical orientation and a horizontal orientation extending laterally of the trailer. Each carrier apparatus also includes a head mounted on the inner shaft and having a fixed inner bracket and a movable outer bracket driven by a hydraulic motor to clamp trusses between the two brackets. Once in the horizontal orientation, the inner shaft can extend from the outer shell to push the discharged trusses away from the trailer to facilitate the departure of the trailer.

BRIEF DESCRIPTION OF THE DRAWINGS

The advantages of this invention will become apparent upon consideration of the following detailed disclosure of the invention, especially when taken in conjunction with the accompanying drawings wherein:

FIG. 7 is an enlarged top plan view of the head of the support member on which trusses are supported for transport on the truss transportation trailer, the movable outer bracket being placed in the maximum open position;

FIG. 7A is an enlarged front elevational view of the support member, including the head depicted in FIG. 7, but showing the underside of the head in the maximum open configuration;

FIG. 7B is an enlarged side elevational view of the support member taken from the outboard side of the support member to reflect the pivotal movement of the support face to accommodate the pitch of the trusses being loaded thereon, the pivotal position of the head corresponds to being loaded with trusses;

FIG. 8 is an enlarged top plan view of the head of the support member on which trusses are supported for transport on the truss transportation trailer, the movable outer bracket being placed in the closed position to clamp a small load of trusses;

FIG. 8A is an enlarged front elevational view of the support member, including the head depicted in FIG. 8, but showing the underside of the head in the closed configuration;

FIG. 8B is an enlarged side elevational view of the support member taken from the outboard side of the support member to reflect the pivotal movement of the support face to accommodate the pitch of the trusses being loaded thereon, the pivotal position of the head corresponds to being loaded with trusses;

DETAILED DESCRIPTION OF THE PREFERRED EMBODIMENTS

Figure 1:
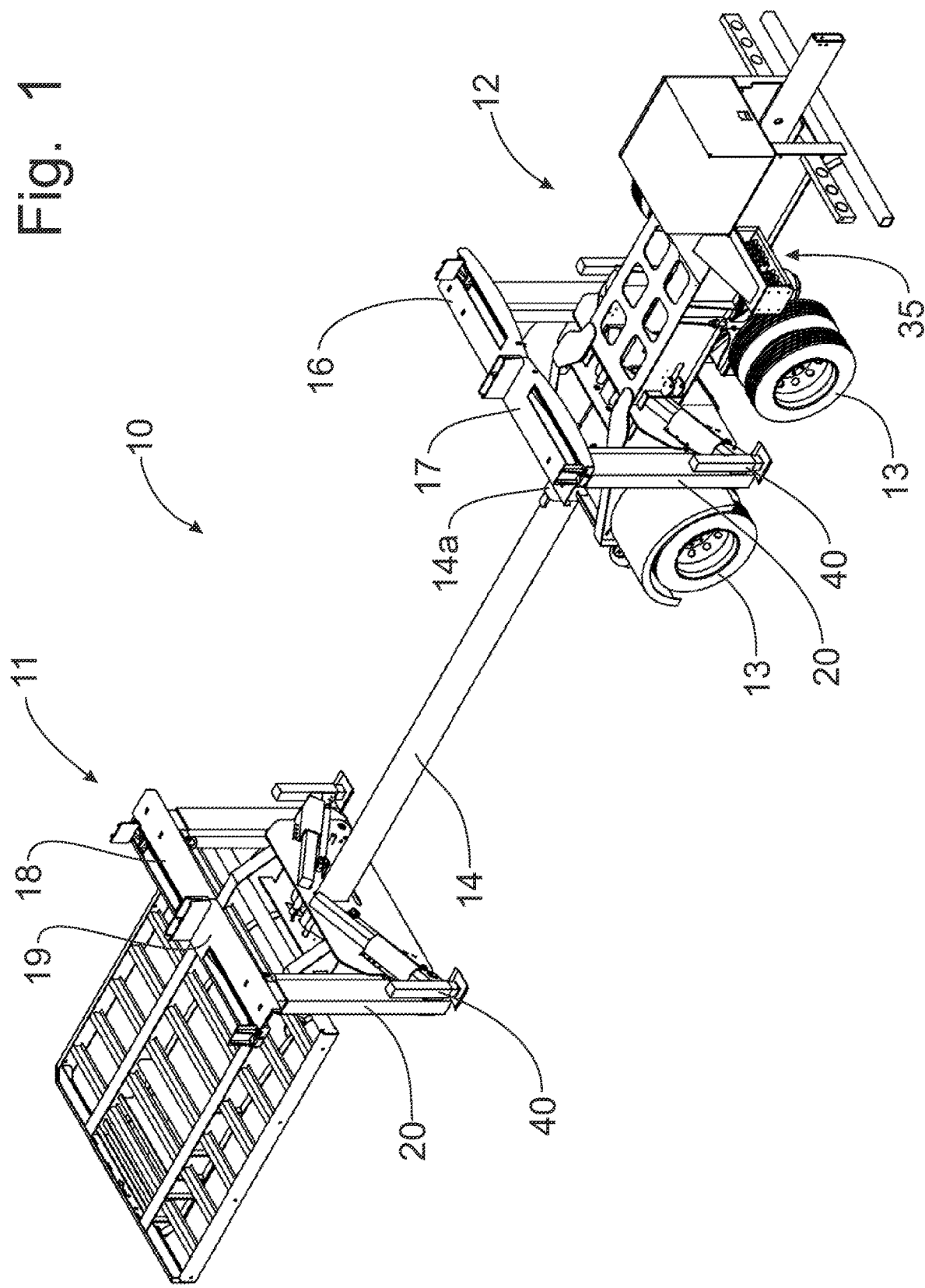
FIG. 1 is a left rear perspective view of a truss transportation trailer incorporating the principles of the instant invention, the components of the truss transportation trailer being depicted in a transport configuration.
Figure 2:
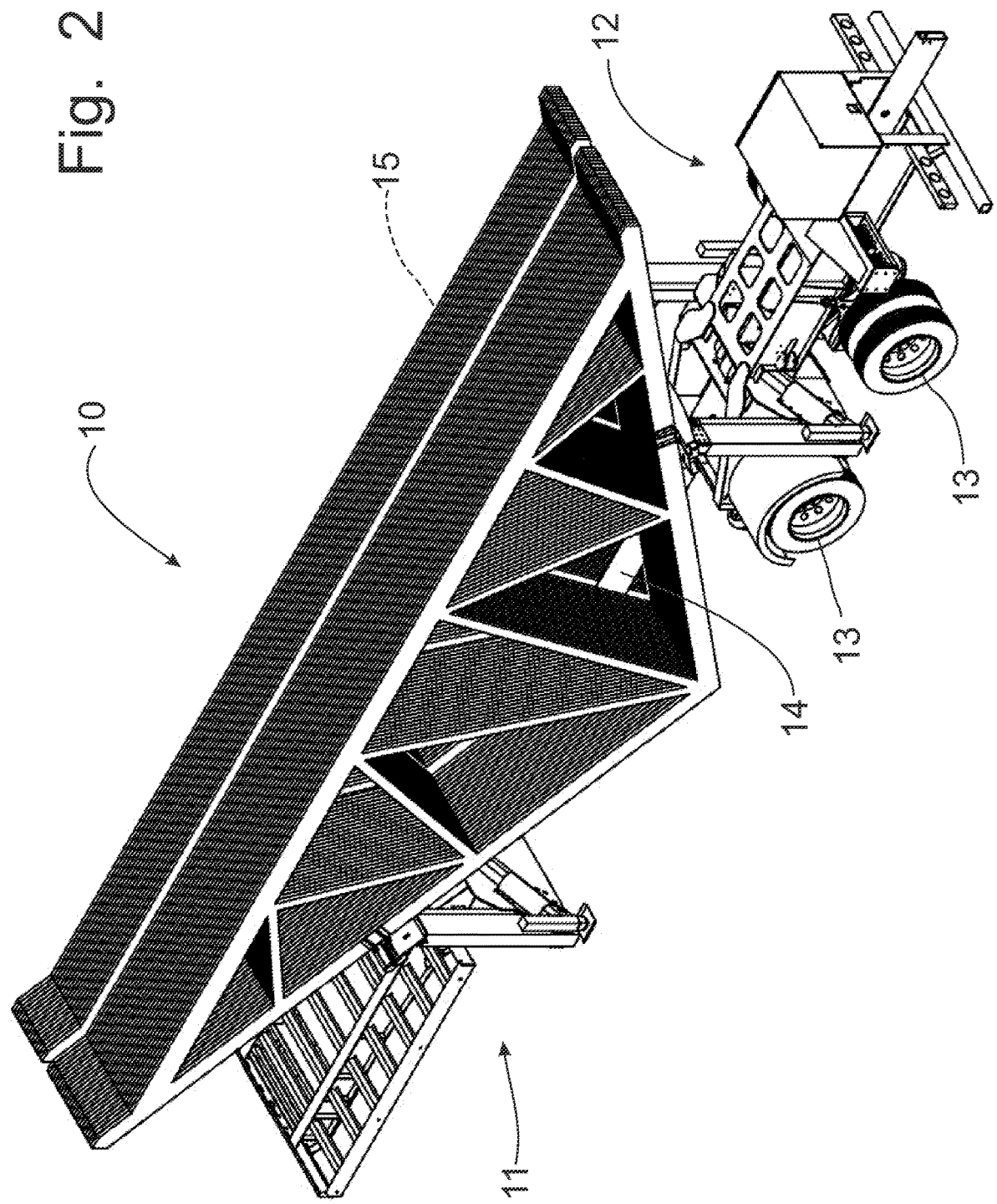
FIG. 2 is a left rear perspective view of the truss transportation trailer shown in FIG. 1, but depicted a representative load of trusses mounted thereon in an inverted configuration.

Referring now to FIGS. 1 and 2, a truss transportation trailer incorporating the principles of the instant invention can be seen. The truss transportation trailer 10 includes a forward assembly 11 that is connected to a mobile vehicle (not shown) providing operative power for the movement and operation of the trailer 10, a rearward assembly 12 that is mounted on wheels 13 to facilitate mobile movement thereof, and an elongated beam 14 interconnecting the forward and rearward assemblies 11, 12. The rearward assembly 12 is movable along the elongated beam 14 and thus, provides an adjustable length of the beam 14 between the forward and rearward assemblies 11, 12 to accommodate different sizes of trusses 15 to be transported. A locking mechanism 14a is operable to secure the telescoped position of the elongated beam 14 relative to the rearward assembly 12 and to permit a repositioning thereof as needed.

A representative load of trusses 15 is depicted in FIG. 2 as being supported in an inverted orientation with the flat side of the truss above the apex which is positioned between the forward and rearward assemblies 11, 12. Each assembly 11, 12 is provided with opposing left and right carrier heads 16-19 with the truss being supported on corresponding right carrier heads 16, 18, or on corresponding left carrier heads 17, 19. Multiple trusses are mounted on each pair of corresponding carriers with the elongated beam 14 being positioned between the right and left groupings of trusses. Trusses are typically mounted on the corresponding carriers as a bundle that is designed to fit on the space provided on the carrier heads 16-19. However, the trusses 15 could be mounted on the corresponding carriers one at a time if desired.

The structure of the individual carrier assemblies 20 is presented in FIGS. 7-8B. Each carrier assembly 20, i.e., left, right forward and rearward, is constructed in the same in the manner depicted in FIGS. 7-8B. Each carrier assembly 20 includes an outer shell 22 that is pivotally supported from the frame of the corresponding forward and rearward trailer assemblies 11, 12 by a horizontal pivot (not shown) that is oriented in a longitudinal direction to permit a movement of the carrier assembly 20 between an upright transport position shown in FIGS. 3 and 4 and a lowered discharge position shown in FIG. 5. The outer shell 22 telescopically receives a tubular member 24 in a manner to permit the extension and retraction of the tubular member 24 relative to the outer shell 22, as will be described in greater detail below. The extension of the tubular member 24 relative to outer shell 22 is demonstrated by the difference in height of the right and left carriers as depicted in FIGS. 5 and 6.

As best seen in FIGS. 7 and 8, each carrier assembly 20 includes a carrier head 16-19 pivotally connected to the tubular member 24 for movement in a longitudinal direction to accommodate the different pitches of the trusses being loaded thereon. The range of pivotal movement of the carrier head 16-19 is limited by stop members (not shown) that define minimum and maximum pivotal positioning of the carrier heads 16-19. As is best seen in FIGS. 7B and 8B, the pivot 21 is off-center with respect to the head 16-19. Thus, when the head 16-19 is not loaded with trusses, the head pivots back against stops to a horizontal orientation for an unloaded transport. Each carrier head 16-19 is formed with a fixed inner bracket 26 oriented orthogonally to the face 25 of the carrier head 16-19, and a movable outer bracket 27 oriented parallel to the inner bracket 26. A threaded adjustment rod 28 is connected to a hydraulic motor 29 and threaded into the outer bracket 27 such that the powered rotation of the hydraulic motor 29 moves the outer bracket along a slot 25a in the face 25 of the carrier head 16-19 in order to clamp the loaded trusses on the carrier head 16-19 between the inner and outer brackets 26, 27.

Figure 3:
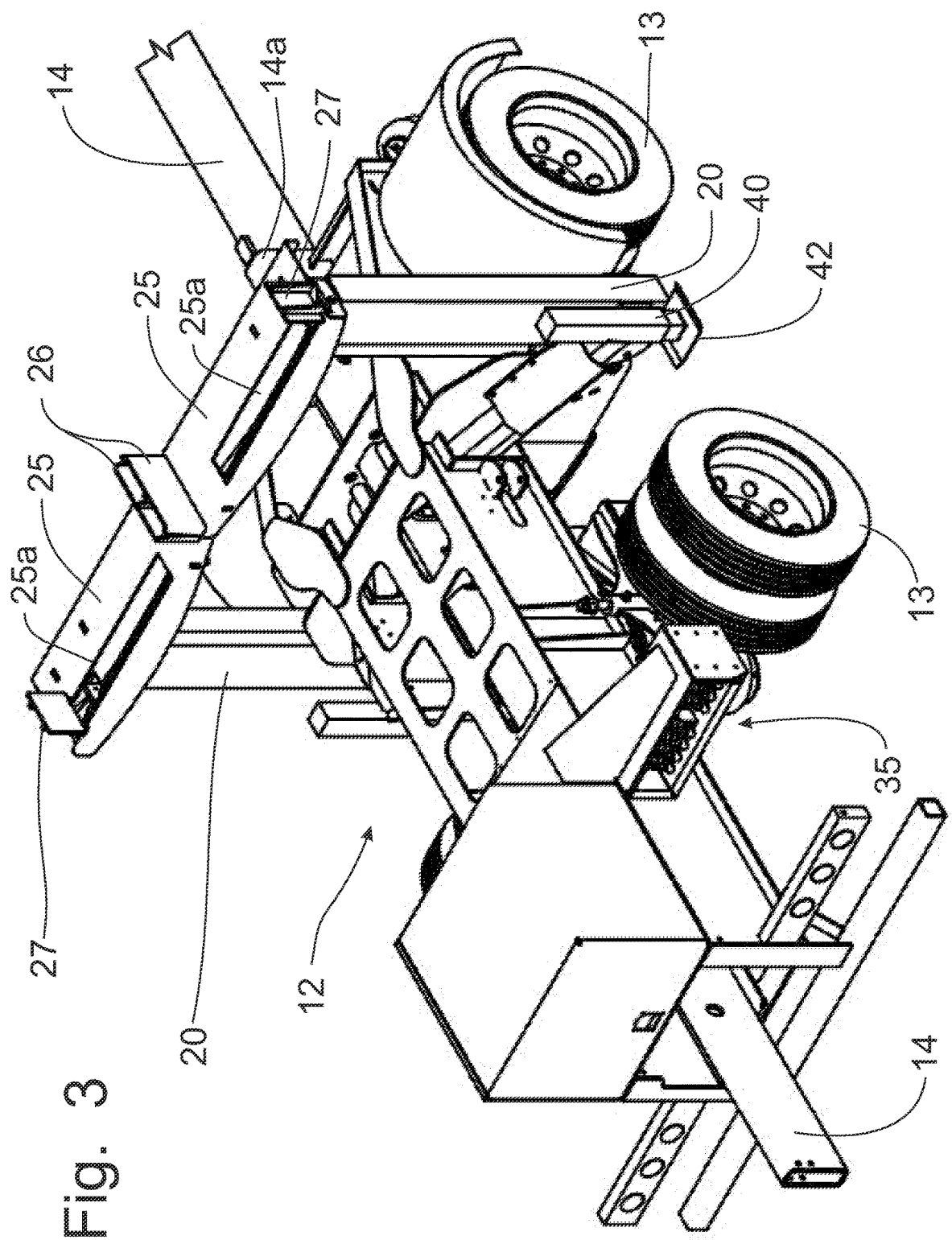
FIG. 3 is an enlarged right perspective view of the rearward end of the truss transportation trailer shown in FIG. 1, depicted in the transportation orientation.
Figure 4:
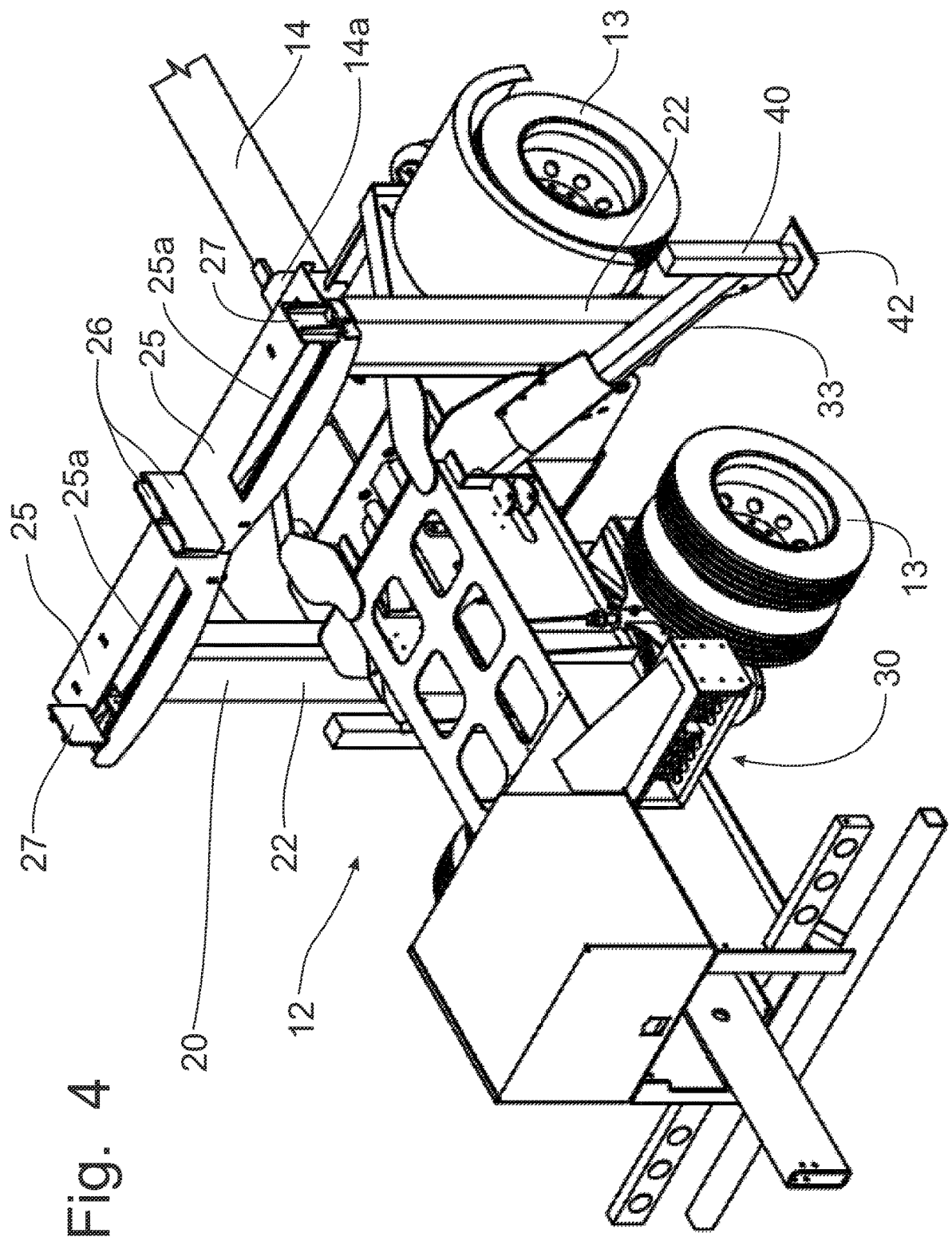
FIG. 4 is an enlarged right perspective view of the rearward end of the truss transportation trailer as shown in FIG. 3, but with the right rear outrigger deployed to provide stability to the trailer during discharge of the trusses therefrom.
Figure 5:
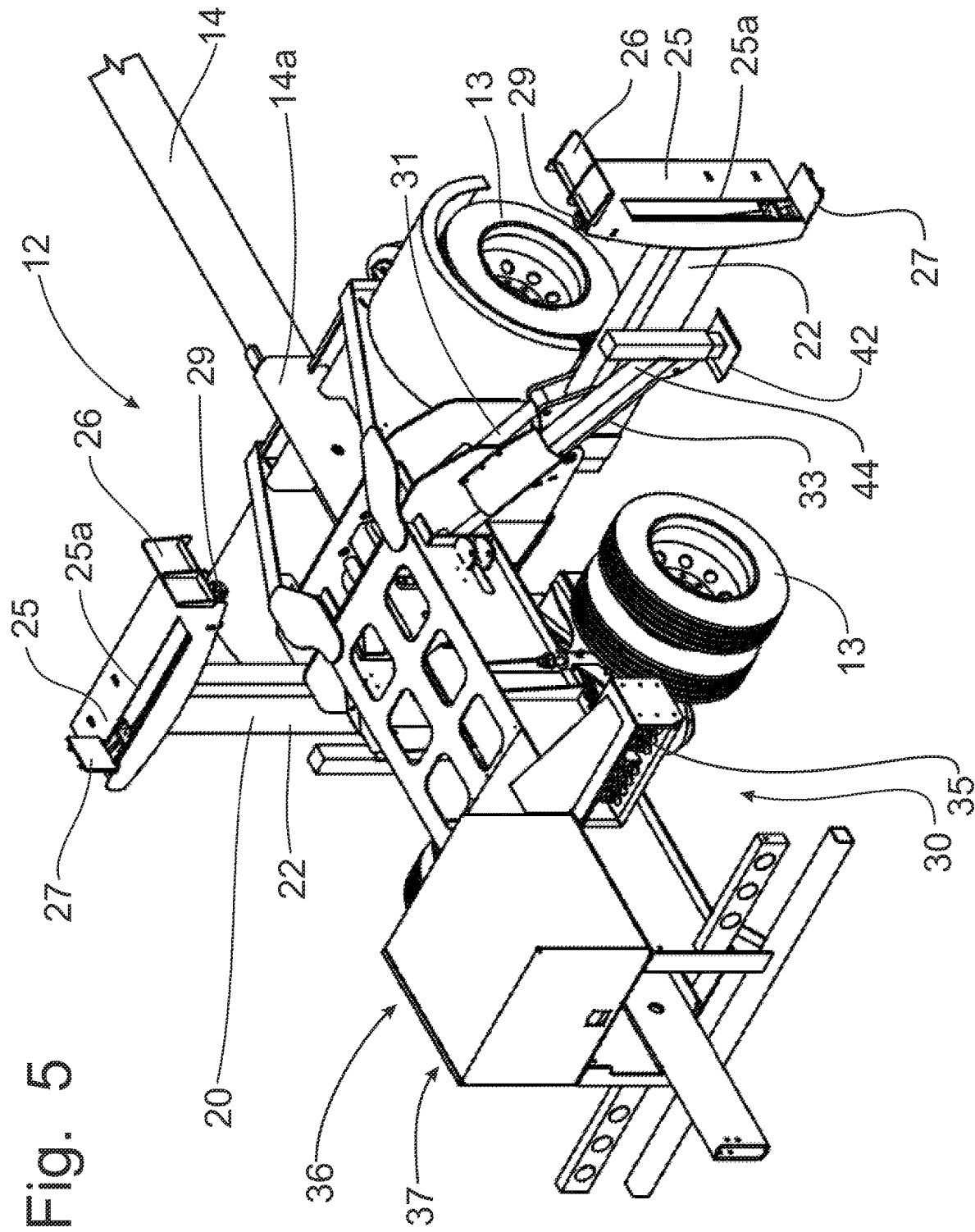
FIG. 5 is an enlarged right perspective view of the rearward end of the truss transportation trailer as shown in FIG. 4, but with the right rear support member lowered to a discharge position for removal of the trusses therefrom.
Figure 6:
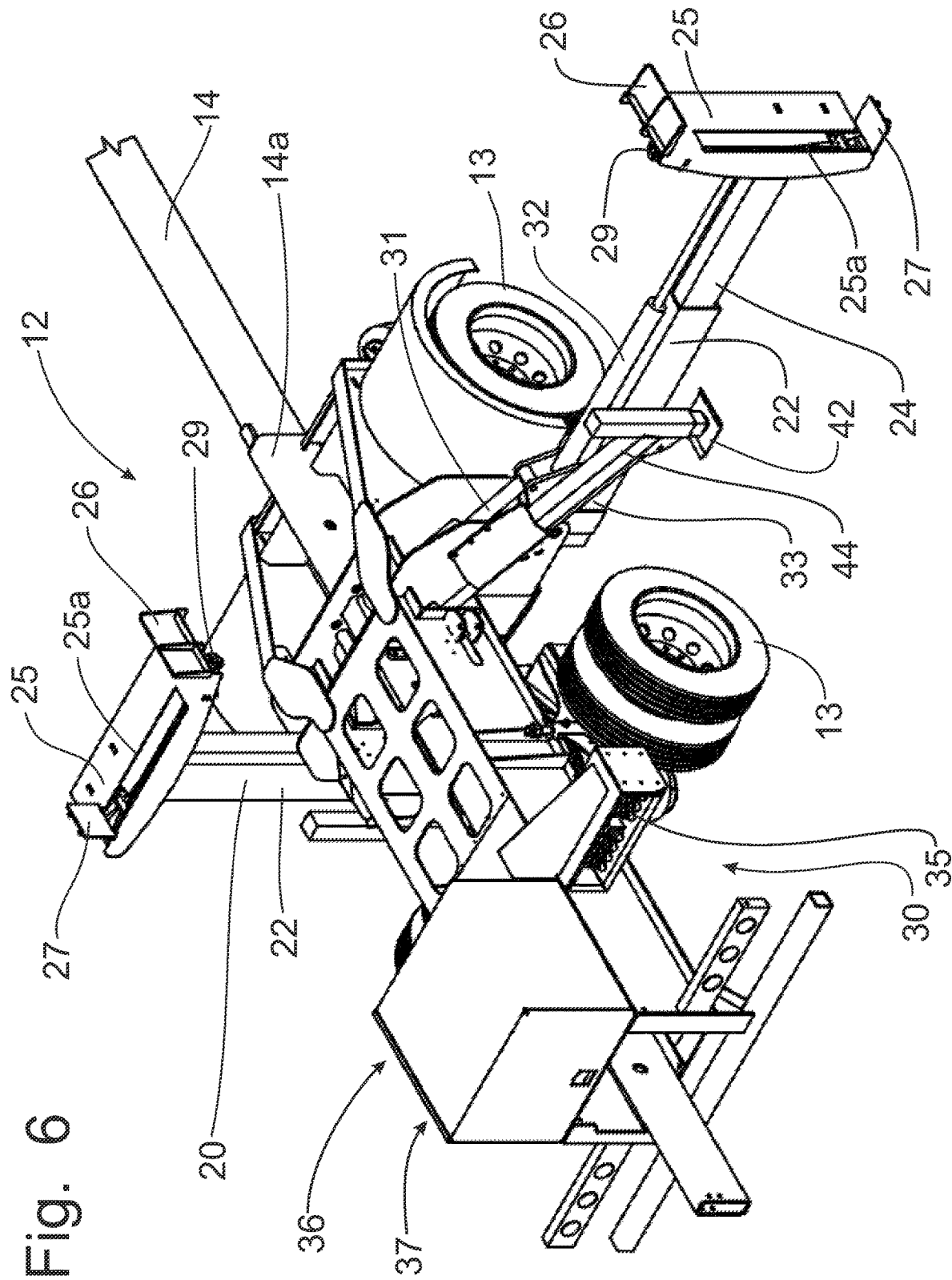
FIG. 6 is an enlarged right perspective view of the rearward end of the truss transportation trailer as shown in FIG. 5, but with the right rear support member extended to push the discharged trusses away from the trailer.
Figure 9:
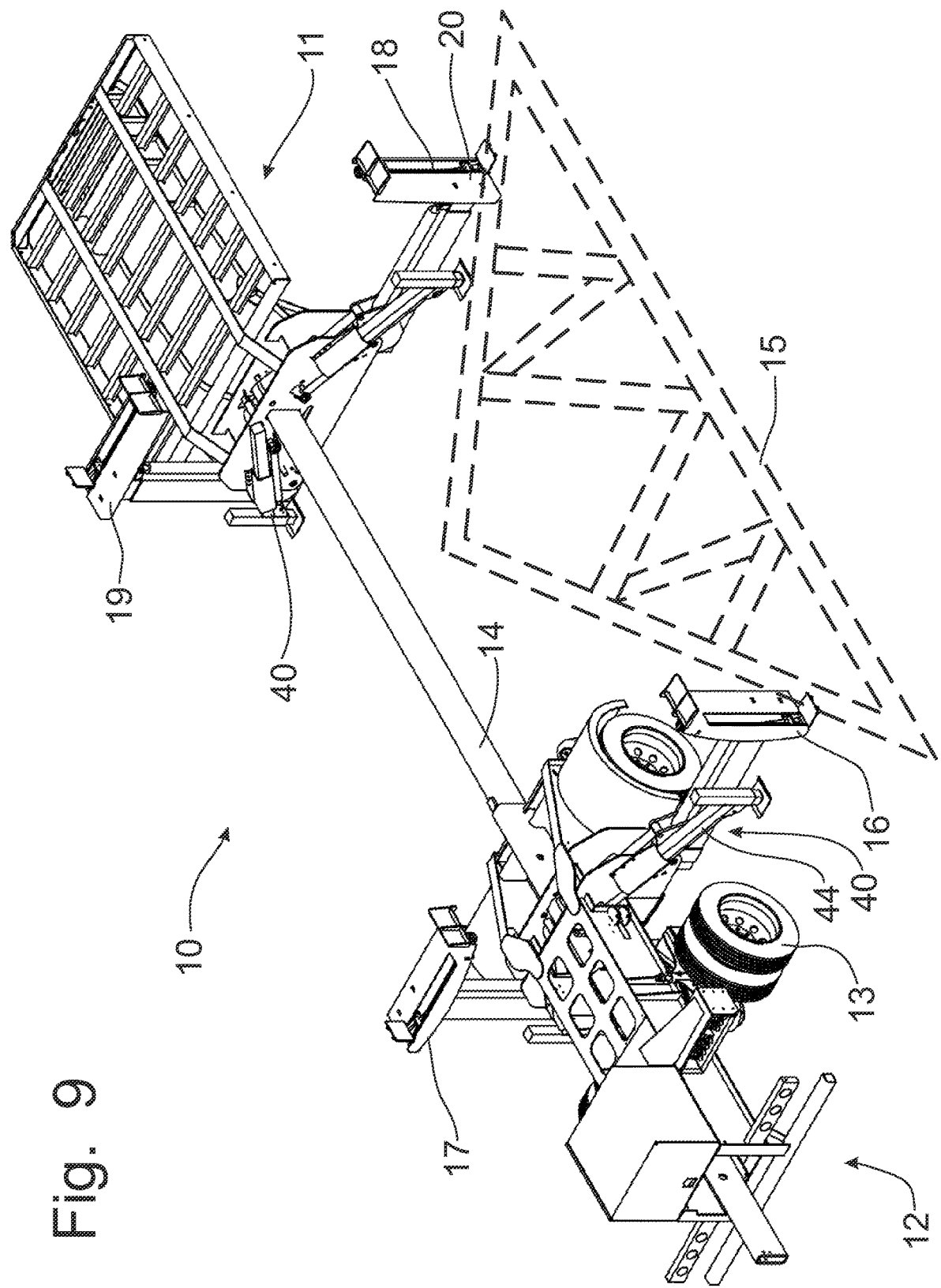
FIG. 9 is a right rear perspective view of the truss transportation trailer with a representative truss lowered by the corresponding front and rear right side support members to position the trusses on the surface of the ground.
Figure 10:
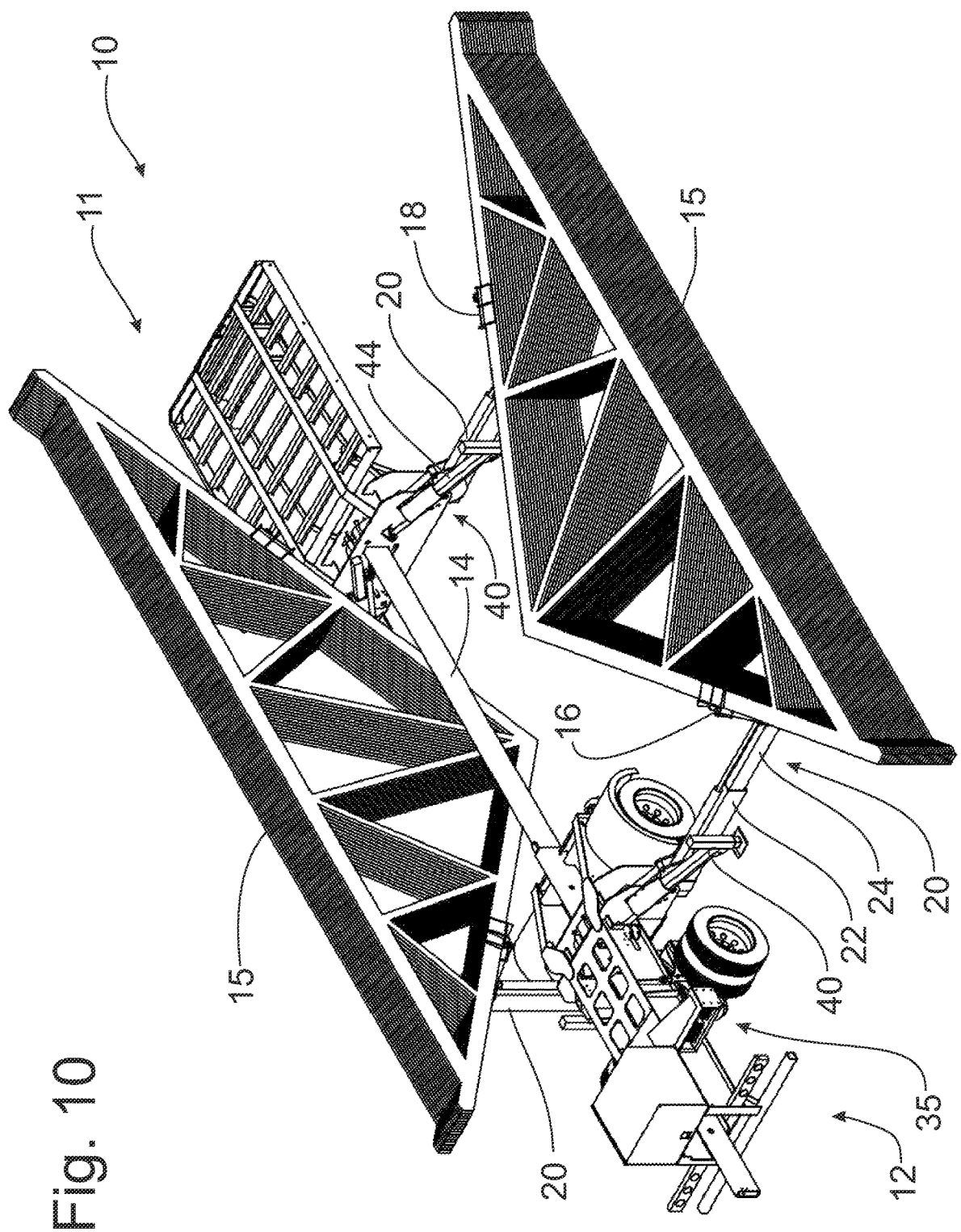
FIG. 10 is a forward right perspective view of the truss transportation trailer with a representative load of trusses being pushed away from the trailer by the extension of the support members.

Referring now to FIGS. 3-6, each carrier assembly 20 includes two linear actuators, such as hydraulic cylinders 31, 32. The first hydraulic cylinder 31 is mounted between the frame of the corresponding trailer assembly 11, 12 and the outer shell 24 of the carrier assembly 20 to power the movement of the carrier assembly between a raised transport orientation, as shown in FIG. 3, and a lowered discharge position, as depicted in FIG. 5, which is schematically shown in FIGS. 3-6. The second hydraulic cylinder 32 is oriented parallel to the outer shell 22 and the tubular member 24 to telescopically extend the head 16-19 as shown in FIGS. 6 and 10, and described in greater detail below. The controls 30 for the hydraulic cylinders 31, 32 are also described in greater detail below.

Each of the forward and rearward trailer assemblies 11, 12, are also equipped with an outrigger 40 located behind the corresponding carrier assembly 20. The outrigger 40 is slidably mounted to the frame of the corresponding trailer assembly 11, 12 by a fixed slanted tube from which support shaft 44 telescopically extends for movement between a raised transport position and a lowered operative position. A third linear actuator, such as hydraulic cylinder 33, interconnects the frame of the corresponding trailer assembly 11, 12 and the outrigger 40, as is depicted in FIG. 6, to power the movement of the outrigger 40. The outrigger 40 has a longitudinally oriented pad 42 that engages the surface of the ground when the outrigger 40 is lowered. One skilled in the art will recognize that the pad 42 could be formed to extend laterally to engage the outside surface of the outer shell 22 of the adjacent carrier assembly 20 to help stabilize the adjacent carrier assembly 20 when both the outrigger 40 and the adjacent carrier assembly 20 are raised to the transport position extension of the pad 42. Such a configuration of the pad 42 would be an optional feature. Further, one skilled in the art will recognize that the movement of the outrigger 40 could be in a pivotal motion to swing from a vertically upright transport orientation to a slanted ground-engaging orientation.

The hydraulic controls 30 include an engine (not shown) to provide power that establishes pressure for the hydraulic system that drives the operation of the hydraulic motors 29 and the various hydraulic cylinders 31-33. An oil pump 36 is operatively connected to the engine to drive the operation of an oil pump 36 to circulate hydraulic fluid between a valve manifold 35 and an oil reservoir 37. The valve manifold 35 includes a valve for operating each hydraulic component 29, 31-33, and is located on each side of the rearward trailer assembly 12. The valve manifold 35 on the right side of the trailer assembly 12 has a lever to control each hydraulic component at the forward assembly 11 and each hydraulic component at the rearward assembly 12. Similarly, the valve manifold 35 on the left side of the rearward trailer assembly 12 controls all of the hydraulic components on the left side of the both the forward and rearward trailer assemblies 11, 12. Thus, the left and right sides are operable independently. An optional remote control (not shown) can be provided to operate the respective valves to drive the corresponding hydraulic component. One skilled in the art will recognize that corresponding front and rear hydraulic components could be operated simultaneously through the manipulation of a single valve manifold 35.

In operation, the length of the central elongated beam 14 is selected to conform to the size of the trusses to be loaded onto the truss transportation trailer 10 by unlocking the locking mechanism 14a and moving the telescopic part of the elongated beam 14, such as by driving the forward trailer assembly 11 forward or rearward relative to the rearward trailer assembly 12 until the elongated beam 14 is positioned appropriately, following which the locking mechanism 14a is re-activated. Trusses 15 can then be loaded onto the selected carrier heads 16, 18 or 17, 19, placed in the raised transport position as shown in FIG. 1, either as a bound package of multiple trusses, or individually until the selected carrier heads 16, 18 or 17, 19 are filled. Then, the opposing carrier heads are filled with trusses 15 in the same manner to provide a balanced load between the left and right sides of the truss transportation trailer 10. The hydraulic controls 35 are then activated to power the operation of the hydraulic motors 29 to move the outside brackets 27 in the direction of the corresponding fixed inner brackets 26 until the load of trusses is clamped between the inner and outer brackets 26, 27 on each of the carrier heads 16-19. The trusses 15 can be secured to prevent lateral movement and then the trusses 15 are transported to the remote job site.

Upon arrival at the job site, the trusses 15 are unloaded by first deploying the outriggers 40 on the side of the truss transportation trailer 10 being unloaded. Deployment of the outriggers 40 is accomplished by activating the hydraulic controls 30 to pressurize the valve manifold 35 and then extending the hydraulic cylinders 33 at least on the desired side of the truss transportation trailer 10 until the pads 42 engage the ground to stabilize the trailer 10 from tipping laterally. Extension of the opposing outriggers 40 could also be done at this point in time. The appropriate hydraulic valve manifold 35 is then activated to lower the two carrier assemblies, front and rear, on the side of the trailer being unloaded, from the raised transport position, shown in FIGS. 3 and 4, to the lowered discharge position, as shown in FIG. 5.

With the lowering of the corresponding front and rear carrier assemblies 20, the apex of the trusses 15 being unloaded will engage the ground and the continued lowering of the carrier assemblies 20 will then lower the trusses 15 to the ground, but still resting on the outer brackets 27 of the carrier heads 16, 18 or 17, 19. The hydraulic controls 30 are then manipulated to extend in a telescopic manner the hydraulic cylinders 32 within the tubular members 24 of the corresponding carrier assemblies 20 so that the two corresponding carrier heads 16, 18 or 17, 19 mounted on the tubular members 24 are moved away from the outer shells 22, thereby pushing the entire load of trusses 15 on the selected side of the trailer 10 away from the trailer 10. This positioning of the load of trusses 15 facilitates the engagement of the unloaded trusses 15 with equipment at the job site for placement of the trusses 15 at a desired remote location. This positioning of the load of trusses 15 also facilitates the extraction of the truss transportation trailer 10 from the job site once both sides of the trailer 10 has been unloaded.

Once the load of trusses 15 has been pushed away from the trailer 10, the hydraulic motors 29 are reversed to move the outer bracket 27 away from the inner bracket 26, thereby unclamping the load of trusses 15, then the hydraulic cylinders 32 are retracted to return the carrier heads 16, 18 or 17, 19 to the previous position adjacent the outer shells 22. The hydraulic cylinders 31 can then be retracted to return the carrier assemblies 20 to the upright transport position. Then, the load of trusses 15 on the opposing side of the trailer 10 can be unloaded as described above. Once all the trusses have been unloaded from the trailer with the carrier assemblies 20 returned to the upright transport position, the outriggers 40 can be returned to the upright transport position by retracting the hydraulic cylinders 33.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A truss transportation trailer having a forward trailer assembly and a rearward trailer assembly interconnected by an elongated beam, comprising:
   a pair of laterally opposing carrier assemblies mounted on each of said forward trailer assembly and said rearward assembly, each carrier assembly including a carrier head mounted on a shaft assembly, each carrier head having a face against which trusses are supported upon loading thereof onto said trailer, each said carrier assembly being pivotally mounted for lateral movement from a raised transport position to a lowered discharge position, said trusses being oriented in a generally horizontal position outboard of said truss transportation trailer when corresponding said carrier assemblies are moved to said lowered discharge position;
   an outrigger mounted on opposing sides of each of said forward trailer assembly and said rearward trailer assembly, each said outrigger being movable between a transport position and a ground engagement position to provide lateral stability to the truss transportation trailer;
   a hydraulic system including a first hydraulic cylinder operably connected to each said carrier assembly to power pivotal movement thereof between said raised transport position to a lowered discharge position; and each said carrier assembly including an outer shell pivotable for movement between said raised transport position and said lowered discharge position powered by said first hydraulic cylinder, and a telescopic inner shaft operably connected to a second hydraulic cylinder to power a telescopic movement of the inner shaft relative to the outer shell.

2. The truss transportation trailer of claim 1 wherein the telescopic movement of said inner shaft powered by said second hydraulic cylinder is operable to push a load of trusses away from the truss transportation trailer when carrier assemblies are in said lowered discharge position.

3. The truss transportation trailer of claim 2 wherein each said carrier head face having laterally opposing inner and outer brackets protruding orthogonally away from said face, said inner bracket being fixed and said outer bracket being movable along said face to clamp trusses loaded on said carrier head face between said inner and outer brackets.

4. The truss transportation trailer of claim 3 wherein each said carrier head including a hydraulic motor supported from said carrier head below said inner bracket and attached to a threaded rod engaged with said outer bracket to move said outer bracket relative to said inner bracket with rotation of said motor.

5. The truss transportation trailer of claim 4 wherein each said carrier head is pivotally mounted on the corresponding inner shaft for movement in a longitudinal direction relative to the direction of travel of said trailer to permit the face of said rotated carrier head to position in alignment with the pitch of the trusses being loaded onto said truss transportation trailer.

6. The truss transportation trailer of claim 5 wherein said pivot is located in a position offset to a center of gravity of said carrier head so that when said trusses are removed from the carrier heads, each carrier head rotates to a generally horizontal position.

7. The truss transportation trailer of claim 4 wherein each said outrigger is oriented in a sloped configuration and includes a slidable outrigger shaft operably connected to an outrigger hydraulic cylinder to move the outrigger shaft in a linear manner from a retracted transport position into an extended ground engagement position outboard of the corresponding forward or rearward assembly.

8. The truss transportation trailer of claim 7 further comprising a hydraulic control system having a bank of controls on each opposing side of the rearward assembly and being operable to control the operations of the first and second hydraulic cylinders, the outrigger hydraulic cylinders and the hydraulic motors located on the corresponding side of the rear assembly only.

9. A method of unloading trusses from a truss transportation trailer having two longitudinally spaced carrier assemblies on each opposing lateral side of said truss transportation trailer, each said carrier assembly being pivotally supported on said truss transportation trailer for pivotal movement in a lateral direction, comprising the steps of:
   clamping said trusses on a carrier head on each said carrier assembly while said carrier assemblies are in a generally vertically oriented transport position; and
   pivoting said truss-loaded carrier assemblies on a selected lateral side of said truss transportation trailer while said trusses are clamped on the carrier heads to position a carrier head on each said carrier assembly into a discharge position on the ground laterally of said truss transportation trailer such that said trusses are oriented generally horizontally on the ground.

10. The method of claim 9 further comprising the step of:
    telescopically extending both said carrier heads while in said discharge position to push said horizontally oriented trusses away from said truss transportation trailer.

11. The method of claim 10 further comprising the step of:
    telescopically retracting both said carrier heads after pushing said trusses away from said truss transportation trailer, and then pivoting said carrier assemblies into a generally vertically oriented transport position.

12. The method of claim 11 wherein each said carrier head is mounted on a shaft assembly including an outer shell and a telescopically received inner shaft on which said carrier head is pivotally mounted, both said steps of telescopically extending and telescopically retracting said carrier heads are powered by a hydraulic cylinder interconnecting said outer shell and said inner shaft.

13. The method of claim 9 wherein each said carrier head includes a face having a fixed inner orthogonal bracket and a movable outer orthogonal bracket, said movable outer bracket being movable along said face relative to said fixed bracket by an actuator, said step of clamping said trusses trapping said trusses between said inner and outer brackets by moving said outer bracket toward said inner bracket.

14. The method of claim 13 further comprising the step of:
    moving said outer brackets away from the corresponding said inner brackets when in said discharge position to un-clamp said trusses and permit said step of telescopically retracting both said carrier heads after pushing said trusses away from said truss transportation trailer.

15. The method of claim 14 wherein each said carrier head is pivotally mounted on a corresponding transversely extending shaft by a transversely oriented pivot for movement of each said carrier head about a plane oriented in a longitudinal direction, said method further comprising the step of pivoting said carrier head about said corresponding transversely extending pivot to match a pitch of said trusses being loaded onto said carrier heads by pivoting on the corresponding shaft for movement in said longitudinally oriented plane to permit the face of said rotated carrier head to position in alignment with the pitch of the trusses being loaded onto said truss transportation trailer.

16. A truss transportation trailer having a forward trailer assembly and a rearward trailer assembly interconnected by an elongated beam, comprising:
   a pair of laterally opposing carrier assemblies mounted on each of said forward trailer assembly and said rearward assembly, each carrier assembly including a carrier head mounted on a shaft assembly, each carrier head having a face against which trusses are supported upon loading thereof onto said trailer, each said carrier assembly being pivotally mounted for lateral movement from a raised transport position to a lowered discharge position, said trusses being oriented in a generally horizontal position outboard of said truss transportation trailer when corresponding said carrier assemblies are moved to said lowered discharge position;
   each said carrier assembly including an outer shell pivotable for movement between said raised transport position and said lowered discharge position, and a telescopic inner shaft operably connected to a second hydraulic cylinder to power a telescopic movement of the inner shaft relative to the outer shell operable to push a load of trusses away from the truss transportation trailer when carrier assemblies are in said lowered discharge position; and
   a hydraulic system including a first hydraulic cylinder operably connected to each said outer shell to power pivotal movement thereof between said raised transport position to a lowered discharge position, and each said second hydraulic cylinder.

17. The truss transportation trailer of claim 16 wherein each said carrier head has a face for supporting loaded trusses, each carrier head having laterally opposing inner and outer brackets protruding orthogonally away from said face, said inner bracket being fixed and said outer bracket being movable along said face to clamp trusses loaded on said carrier head face between said inner and outer brackets.

18. The truss transportation trailer of claim 17 wherein each said carrier head includes a rotatable motor supported from said carrier head below said inner bracket and attached to a threaded rod engaged with said outer bracket to move said outer bracket relative to said inner bracket with rotation of said motor.

19. The truss transportation trailer of claim 18 further comprising a hydraulic control system having a bank of controls supported on each opposing side of the rearward assembly, each said bank of controls being operable to control the operations of only the first and second hydraulic cylinders, the outrigger hydraulic cylinders and the rotatable motors located on the corresponding side of the rear assembly.

* * * * *